(12) United States Patent
Hogen-Esch et al.

(10) Patent No.: US 8,236,902 B2
(45) Date of Patent: Aug. 7, 2012

(54) FLUOROCARBON MEDIATED POLYMER BLENDS AND METHODS FOR MAKING THEREOF

(75) Inventors: Thieo Hogen-Esch, Los Angeles, CA (US); Jingguo Shen, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 730 days.

(21) Appl. No.: 11/923,522

(22) Filed: Oct. 24, 2007

(65) Prior Publication Data

US 2008/0093283 A1     Apr. 24, 2008

Related U.S. Application Data

(60) Provisional application No. 60/862,734, filed on Oct. 24, 2006.

(51) Int. Cl.
*C08F 8/24* (2006.01)
*C08L 23/28* (2006.01)
*C09K 11/06* (2006.01)

(52) U.S. Cl. ........... 525/326.4; 525/55; 525/63; 525/70; 525/199; 525/474; 525/509; 525/931

(58) Field of Classification Search ........... 525/50, 525/55, 191, 474, 479, 509, 518, 199, 231, 525/212, 241, 217, 326.1, 326.4, 326.7, 63, 525/931

See application file for complete search history.

(56) References Cited

U.S. PATENT DOCUMENTS

| | | | |
|---|---|---|---|
| 4,574,139 A * | 3/1986 | Sato et al. | 525/61 |
| 6,339,121 B1 * | 1/2002 | Rafailovich et al. | 524/445 |
| 2008/0207808 A1 * | 8/2008 | Abecassis et al. | 524/262 |

OTHER PUBLICATIONS

IUPAC definition of fluorocarbon available online at http://goldbook.iupac.org/F02459.html on Jan. 29, 2011.*
Amis, E.J.; Hu, N.; Seery, T.A.P.; Hogen-Esch, T.E.; Yassini, M.; Hwang, F. "Associating polymers containing fluorocarbon hydrophobic units". In: Hydrophilic Polymers, Performance with Environmental Acceptance. Washington, DC: ACS, 1996. p. 279-302.
Barlow, J.W.; Shaver, G.; Paul, D.R. "Polymer Blend Compatibilization Through Chemical Reaction". Compalloy '89 1989, 223-244.
Brisson, J. "Blends, Hydrogen Bonds, and Orientation: Understanding the Role of Interactions". Polymer Engineering and Science 2004, 44(2):241-251.
Da, J.; Hogen-Esch T.E. "Synthesis and Hydrophobic Association of Poly(N,N-dimethylacrylamide) Copolymers with Perfluorocarbon Pendent Groups Connected through Polyethylene-glycol Tethers". J. Pol. Sci.: Part A: Polymer Chemistry, 42:360-373 (2004).
Da, J.; Hogen-Esch T.E. "Poly(N,N-dimethylacrylamide)s with Perfluorocarbon Pendent Groups Connected through Poly(ethylene glycol) Tethers Give Physical Gels in Organic Solvents". Macromolecules 2003, 36:9559-9563.
Danielson, N. D.; Beaver, L.G.; Wangsa, J. "Fluoropolymers and fluorocarbon bonded phases as column packings for liquid chromatography". Journal of Chromatography 1991, 544:187-199.
Gaylord, N.G. "Compatibilizing Agents: Structure and Function in Polyblends". J. Macromol. Sci.—Chem., A26(8):1211-1229 (1989).
He, Y.; Li, J; Uyama, H.; Kobayashi, S.; Inoue, Y. "Hydrogen-Bonding Interaction and Miscibility between Poly(ε-caprolactone) and Enzymatically Polymerized Novel Polyphenols". J. Poly. Sci. B. Poly Phys. 2001, 39:2898-2905.
Hwang, F.S.; Hogen-Esch, T.E. "Effects of Water-Soluble Spacers on the Hydrophobic Association of Fluorocarbon-Modified Poly(acrylamide)". Macromolecules 1995, 28:3328-3335.
Markham, R.L. "Introduction to Compatibilization of Polymer Blends*". Adv. Polym. Tech. 1990, 10(3):231-236.
Nakahama, S.; Hirao, A. "Synthesis of telechelic and block polymers with functional groups and formation of the ordered structures in the blends of the polymers". Elsevier 1993, C:307-314.
O'Mahony, T.K.P.; Cox, A.P.; Roberts, D.J. "Gas chromatographic separation of perfluorocarbons". Journal of Chromatography 1993, 637(1):1-11.
Paul, D.R. "Interfacial agents ('Compatibilizers') for Polymer Blends". Polymer Blends, 1978, 2:35-62.
Perrier, S.; Jackson, S.G.; Haddleton, D.M.; Ameduri, B.; Boutevin, B. "Preparation of fluorinated methacrylic copolymers by copper mediated living radical polymerization". Tetrahedron 58 (2002) 4053-4059.
Seery, T.A.P.; Yassini, M.; Hogen-Esch, T.E.; Amis, E.J. "Static and Dynamic Light Scattering Characterization of Solutions of Hydrophobically Associating Fluorocarbon-Containing Polymers". Macromolecules, 1991, 25:4784-4791.
Sperling, L.H. "Introduction to Physical Polymer Science". Glass-Rubber Transition Behavior, John Wiley & Sons, New Jersey, 2006, 399-420.
Tae, G.; Kornfield, J.A.; Hubbell,J.A.; Johannsmann, D.; Hogen-Esch, T.E. "Hydrogels with Controlled Surface Erosion Characteristics from Self-Assembly of Fluoroalkyl-Ended Poly(ethylene glycol)". Macromolecules 2001, 24:6409-6419.
Tang, T.; Huang, B. "Interfacial behavior of compatibilizers in polymer blends". Polym. 1994, 35(2):281-285.
Utracki, L.A. "Introduction to Polymer Alloys and Blends". Polymer Blends and Alloys. New York: Hanser, 1990, 1:1-27.
Xanthos, M.; Dagli, S.S. "Compatibilization of Polymer Blends by Reactive Processing". Polymer Engineering and Science, 1991, 31(13):929-935.

* cited by examiner

*Primary Examiner* — Irina S Zemel
*Assistant Examiner* — Jeffrey Lenihan
(74) *Attorney, Agent, or Firm* — DLA Piper LLP (US)

(57) ABSTRACT

The present invention discloses a method for making blended polymers by utilizing fluorophilic inter-polymer associative interactions between perfluorocarbon functional groups attached on the constituent polymers. The method of the present invention is capable of forming blended polymers from otherwise incompatible polymers. Also disclosed are blended polymers obtained by the method thereof. Methods and devices utilizing novel blended polymer of the present invention including chromatography, catalysis, photonic and sensor applications are also provided.

9 Claims, 10 Drawing Sheets

FLUOROCARBON MEDIATED POLYMER BLENDS AND METHODS FOR MAKING THEREOF

CROSS-REFERENCE TO RELATED APPLICATIONS

This application claims an invention which was disclosed in Provisional Application No. 60/862,734, filed Oct. 24, 2006, entitled "BLOCK COPOLYMER-LIKE PHASE BEHAVIOR OF VINYL POLYMER BLENDS END-CAPPED WITH PERFLUOROALKYL CHAINS". The benefit under 35 USC §119(e) of the United States provisional application is hereby claimed. The above priority application is hereby incorporated herein by reference.

FIELD OF THE INVENTION

The present invention generally relates to the field of polymer science. In particular, the present invention is related to a method for forming polymeric materials comprising incompatible constituent polymers and the novel polymers thus formed.

BACKGROUND OF THE INVENTION

The term "polymers", as generally understood in the art, are molecules composed of repeating structural units, or monomers, connected by covalent chemical bonds. Well known examples of polymers include plastics, DNA and proteins.

As a class of material, polymers are versatile and has played an important part in modern industrialized society. The range of physical and chemical properties that may be obtained by putting together different monomers to form different polymers appears to show endless possibilities. One method of achieving this structural diversity is by stringing together different types of monomers to form a polymer molecule. A polymer molecule derived from two or more monomeric species is referred to as a copolymer, as opposed to a homopolymer (Polymer 1 of FIG. 1), which is composed purely of one single monomeric species.

Accordingly, the term "copolymerization" refers to methods used to chemically synthesize a copolymer. Commercially relevant copolymers include ABS plastic, SBR, styrene-isoprene-styrene (SIS) and ethylene-vinyl acetate (EVA).

Since a copolymer consists of at least two types of constitutional units (not structure units), copolymers can be classified based on how these units are arranged along the chain. These include: alternating copolymers (Polymer 2 of FIG. 1) with regular alternating A and B units; periodic copolymers with A and B arranged in a repeating sequence (e.g. A-B-A-B-B-A-A-A-B-B-B)$_n$; random copolymers (Polymer 3 of FIG. 1) with random sequences of monomer A and B; statistical copolymers in which the ordering of the distinct monomers within the polymer sequence obey known statistical rules; and block copolymers (Polymer 4 of FIG. 1) which comprises two or more homopolymer subunits linked by covalent bonds. The union of the homopolymer subunits may require an intermediate non-repeating subunit, known as a junction block. Block copolymers with two or three distinct blocks are called diblock copolymers and triblock copolymers, respectively.

Copolymers may also be described in terms of the existence of or arrangement of branches in the polymer structure. For example, linear copolymers consist of a single main chain whereas branched copolymers consist of a single main chain with one or more polymeric side chains.

Graft copolymers are a special type of branched copolymer in which the side chains are structurally distinct from the main chain. Polymer 5 of FIG. 1 depicts a special case where the main chain and side chains are composed of distinct homopolymers. However, the individual chains of a graft copolymer may be homopolymers or copolymers. Note that different copolymer sequencing is sufficient to define a structural difference, thus an A-B diblock copolymer with A-B alternating copolymer side chains is properly called a graft copolymer.

Other special types of branched copolymers include star copolymers, brush copolymers, and comb copolymers.

In man-made plastics, copolymerization is used to modify the properties of the material to a specific needs, for example to reduce crystallinity, modify glass transition temperature or to improve solubility. In this regard, block copolymers are of particular interest because they can "microphase separate" to form periodic nanostructures.

Microphase separation is a situation similar to that of oil and water. Oil and water don't mix together-they macrophase separate. Given a first "oil-like" block and a second "water-like" block, the block copolymers will undergo microphase separation because the blocks will want to get as far from each other as possible. But they are covalently bonded, so they are not able to get very far, hence, they can only "microphase separate". Under such conditions, the "oil" and "water" or hydrophobic and hydrophilic blocks tend to form nanometer-sized structures. These structures can look like spheres of polymethyl methacrylate (PMMA) in a matrix of polystyrene (PS) or vice versa, or they could be stripes (often called laminates) or cylinders. The nanostructures created from block copolymers could potentially be used for creating devices for use in computer memory, nanoscale-templating and nanoscale separations.

As explained above, the versatility of polymers is due in large part to its structurally variety. Blending homopolymers, as opposed to copolymerization, is believed to be another effective method for obtaining polymer materials with a desirable combination of the properties from two or more components. However, most polymer pairs are immiscible and are referred to as being "incompatible". Thus, two separate phases are formed. Alternatively partial mixing occurs leading to relatively large sized separate domains (>1 micron) corresponding to each of the components. This typically leads to poor mechanical and optical properties that often have the worst rather than best combination of properties.

In contrast, so called AB or ABA "block copolymers" in which the A and B polymer blocks are covalently attached tend to give much smaller lamellar or other highly organized domains (order of 20-100 nm) that have superior properties. Examples are the so called "Kratons" thermoplastic elastomers (rubbers) where two outer "hard" PS blocks enclose the inner elastomeric block consisting of polyisoprene (PI) or polybutadiene (PBD). In the solid state at room temperature such elastomers are "crosslinked" through the hard PS domains. Upon heating well above the so called glass transition (softening) temperature of polystyrene (about 100° C.) these domains lose their cohesive strength and the PS-PI-PS or PS-PBD-PS polymers now become liquid-like and, unlike conventional elastomers, they may be reprocessed. However, the synthesis of such block copolymers typically is not trivial, and it is expensive. Thus, the block copolymerization approach has not yet found wide industrial applications and blending is still preferred.

Another conceivable approach to overcome the shortcomings of blending is to chemically modify the homopolymers to introduce attractive interactions that stabilize the interfaces between the incompatible blend components. Examples are hydrogen bonding, acid-base, charge-transfer, ion-dipole, donor-acceptor adducts and transition metal complexes. However, such chemical modifications typically are impractical and/or expensive.

Therefore, there still exists a need for better methods of blending "incompatible" polymers to form novel polymeric materials.

SUMMARY OF THE INVENTION

In view of the above difficulties in the art, it is one object of the present invention is to provide a method for forming polymer blends from incompatible constituent polymers.

It is another object of the present invention is to provide polymer blends whose physical and chemical characteristics can be tuned by selection of their constituent polymers.

These and other objects of the present invention, which will become more apparent in conjunction with the following detailed description of the preferred embodiments, either along or in combinations thereof, have been satisfied by the discovery that fluorocarbon functional groups, when attached to polymers of varying characteristics, will act as a mediator to provide for an interface between the polymers, thereby, enabling incompatible polymers to easily become associated.

Accordingly, in a first aspect of the present invention, there is provided a method for blending two or more constituent polymers to form a polymer blend having the general steps of:
(1) attaching one or more fluorocarbon ($R_F$) functional groups to each of the constituent polymers to form $R_F$ functionalized polymers; and
(2) blending the $R_F$ functionalized polymers to form a blended polymer.

In a second aspect, there is also provided a fluorocarbon mediated polymer blend having at least two constituent polymers each functionalized with at least one fluorocarbon ($R_F$) functionality, wherein at least one constituent polymer is incompatible with at least one other constituent polymer before being functionalized with $R_F$ and wherein the constituent polymers are held together in the polymer blend via fluorophilic interactions between the added $R_F$ functionalities.

In a third aspect, there is also provided a chromatographic column that utilizes a fluorocarbon mediated polymer blend in accordance with embodiments of the present invention. Exemplary embodiments of a chromatographic column of the present invention includes the general components of: a hollow tubular body having a first end and a second end; and a polymer blend in accordance with the second aspect of the present invention disposed inside the hollow body, wherein the fluorocarbon mediated polymer blend further includes a crater at an interface between two or more interacting $R_F$ functionalities, and wherein the $R_F$ functionalities are exposed and available to interact with an analyte solution.

In a fourth aspect, there is also provided a polymer-based catalyst, which includes a fluorocarbon mediated polymer blend in accordance with the second aspect of the present invention, wherein the $R_F$ functionalities of the constituent polymers interact to form at least a crater at an interface, and wherein the $R_F$ functionalities are capable of recognizing and binding to reactants of a chemical reaction such that binding of the reactants serves to confine the reactants to close spatial proximity, thereby, enhancing the reaction rate.

In a fifth aspect there is also provided a light harvesting polymeric material which includes a polymer blend in accordance with the second aspect of the present invention, wherein at least one $R_F$ functionalities of the constituent polymers further includes a chromophore; and an electron conducting or a hole conducting domain located in close proximity to the chromophore such that photonic energy captured by the chromophore may be harvested by the electron conducting or hole conducting domain.

In a sixth aspect, there is also provided a chemical and/or biochemical sensor for detecting an analyte having a selected fluorocarbon ($R_F$) functionality. Embodiments according to this aspect of the present invention generally includes a polymer functionalized with fluorocarbon ($R_F$) functionalities capable of interacting with the selected $R_F$ functionality through fluorophilic interaction; and a first chromophore disposed on the polymer or attached to the $R_F$ functionalities. The analyte further includes a second chromophore capable of acting as an energy acceptor/donor to the first chromophore in a fluorescence resonance energy transfer (FRET) interaction. In operation, detection of the analyte is reported when application of a radiative energy at an excitation wavelength corresponding to the excitation wavelength of the donor chromophore results in a FRET event Other aspects and advantages of the invention will be apparent from the following description and the appended claims.

BRIEF DESCRIPTION OF THE DRAWINGS

FIG. 1 shows schematic representations of different types of polymers.

DETAILED DESCRIPTION

Figure 2:
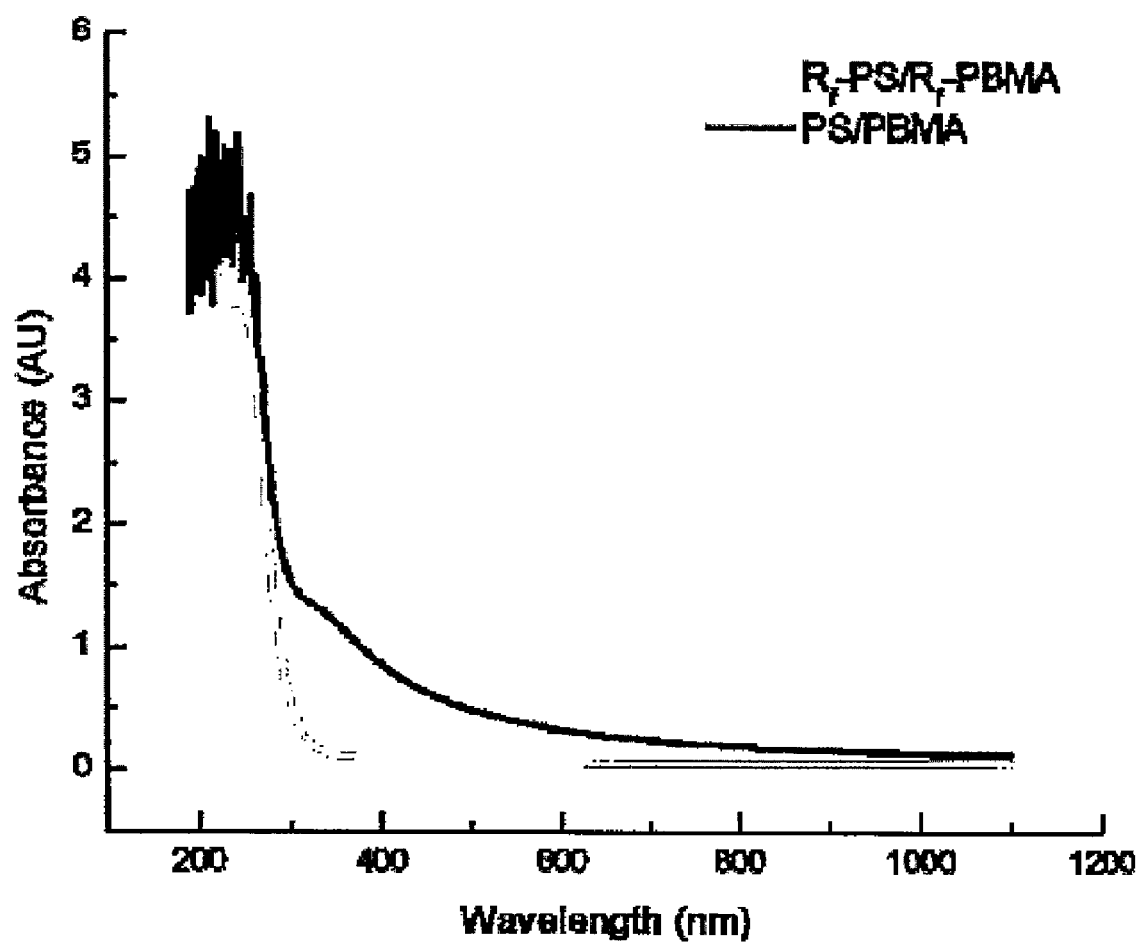
FIG. 2 Optical transmittance of 1/1 (wt/wt) blends of PS-$R_F$ and PBMA-$R_F$.

As set forth above, it is desirable to be able to combine polymers having various desirable characteristics to form a blend which may exhibit the combined beneficial characteristics or possess superior emergent properties derived from the constituents. For instance, the blending of poly (meth) acrylates (PMMA), or other polymers with low glass transition temperatures, with polystyrene have been shown to improve mechanical properties by increasing toughness and other physical properties. Examples are known in which simple blends of this type give properties that are weighted averages of their components, thus allowing fine-tuning of optical, mechanical and other properties. However, due to the fact that polymers having various desirable characteristics are often incompatible with each other (e.g. hydrophobic and hydrophilic polymers), blending these polymers often prove to be challenging, if not impossible. Even when blended, the resulting characteristics of the polymer blend are often less than ideal.

In view of the difficulties in the art, the present invention provides a method that is capable of overcoming these difficulties and enabling formation of polymer blends from previously incompatible constituent polymers. In general, methods in accordance with the present invention are based on the discovery that polymers with fluorocarbon ($R_F$) functional groups attached may exhibit "fluorophilic" associative interactions which allows previous incompatible polymers to form coherent blends. Upon annealing, blends of these polymers interact through fluorophilic interactions and give polymer blends that exhibit block-copolymer-like morphologies and properties.

In one aspect, a method of the present invention has the general steps of: (1) attaching $R_F$ functional groups to constituent polymers; and (2) blending the constituent polymers to form a polymer blend. Constituent polymers are preferably synthetic linear polymers. Exemplary linear polymers may include: A. Vinyl polymers having the general structure of —[$CH_2$—C(R)C(Y)=X]$_n$ where X and Y can be carbon oxygen, sulfur or nitrogen and R is a group that includes alkyl, CN, or other small groups consistent with favorable polymerization thermodynamics. These include polymers synthesized by polymerization or copolymerization by radical, cationic, anionic, metallocene, metathesis or other polymerization methods involving organometallic initiators. This group includes but is not limited to: polystyrene, polyethylene, polypropylene, polyisobutylene, polybutadiene, polyisoprene, polymethylmethracrylate, polybutylmethacrylate and other polymethacrylates, polybutylacrylate and other polyalkylacrylates, polyvinylchloride, polyvinylcarbazole, polyvinylpyrrolidone, polyacetylene, polyvinylferrocene, polyacrylonitrile, polyvinylacetate polyvinyl(oxadiazole) and similar vinyl polymers having heterocyclic pendent groups. Included are also the copolymers incorporating two or more of the above vinyl monomers. B. Polyethers, polyesters, polyamides, polyacetals polysiloxanes formed by anionic or cationic ring opening chain polymerization of cyclic ethers, lactones, lactams and N-carboxyanhydrides, cyclic acetals and cyclic siloxanes respectively. Included are also the copolymers incorporating two or more of the above cyclic monomers. Pendent group functionalization is carried out by copolymerization with the corresponding $R_F$-functionalized comonomers. End functionalization is carried out by reaction of the polymer end groups with suitable $R_F$ compounds using well known conventional chemistry, i.e. reaction of anionic or cationic end groups with suitable nucleophiles or electrophiles containing $R_F$ groups. C. Polymers or copolymers synthesized by step (co)polymerizations including but not limited to: polyesters such as polyethylene terephthalate, polyamides containing alkylidene groups in the main chain such as: nylon 6/6, nylon 6, nylon 6/10, nylon 12, nylon 11, nylon 12/12, polyamides and polyimides, containing aromatic (1,4-phenylene or 5- or 6-membered heterocyclic aromatic) groups in the main chain for example: imidazole, oxazole, pyrazole, tetrazole, triazole, thiophene, pyridine, triazine and similar heterocyclic groups. Other examples include but are not limited to: polyurethanes, polycarbonates, aromatic polyethers having one or two alkyl groups on the phenylene group or polysulfides, poly(p-xylylene), polyurethanes, polysulfides, polyurethanes and polysiloxanes. These aforementioned polymers are for illustrations only and are not intended to be limiting in any way. A personal skilled in the art will recognized that any other linear polymers commonly known in the art having similar characteristics may also be used. In some embodiments, other types of polymers, including non-linear polymers may also be beneficially employed.

Suitable $R_F$ functional groups may include: —($CF_2$)$_n$$CF_2H$, —$CO(CF_2)_n CF_2H$, —$(CF_2)_n CF_3$, —$CO(CF_2)_n CF_3$ or groups of this type having the structure: —$S(CF_2)_n CF_3$, —S—$CO(CF_2)_n CF_3$, —S—$(CF_2)_n CF_2H$ or —S—$CO(CF_2)_n CF_2H$ where S is a spacer group containing one or more methylenes and may containing one or more oxygen or other heteroatoms, or any other $R_F$ groups commonly known in the art.

Attachment of the $R_F$ functional groups can be done either at the polymer synthesis stage or be added after synthesis in a post-production process. Suitable methods for making the attachment will depend on the particular functional group and polymer of choice. It will also depend on the location and proportion of attachment to be made. For example, an $R_F$ group may be attached at the terminal end of a polymer (i.e. end-capped) or on the side along the linear chain (i.e. pendent attachment). Exemplary chemical methods for attaching an $R_F$ group to a polymer may include using a free radical initiator containing an $R_F$ group such as a peroxide or azo type initiator. Alternatively the $R_F$ groups are introduced by a chain- or step-copolymerization of a comonomer having at least one of the above $R_F$ group(s). The incorporation of $R_F$ groups is well known to those skilled in the art and may involve the incorporation of such groups by electrophilic or nucleophilic aromatic substitution reactions and/or by well known reactions of the $R_F$-containing alcohols or amines with esters, carboxylic acids or acid halide groups or perfluorocarbon acylhalides or anhydrides with alcohols or amines of the comonomers. An example of such an initiator is an ester formed by reaction of a perfluorocarbon alcohol such as 1,1, 2,2,tetrahydroperfluorodecanol with alphabromoisobutyrylbromide to give the corresponding $R_F$-alphabromoester that is used to initiate vinyl monomers via atom transfer polymerization (ATRP) in the presence of cuprous/cupric ion in an organic solvent.

Figure 10:
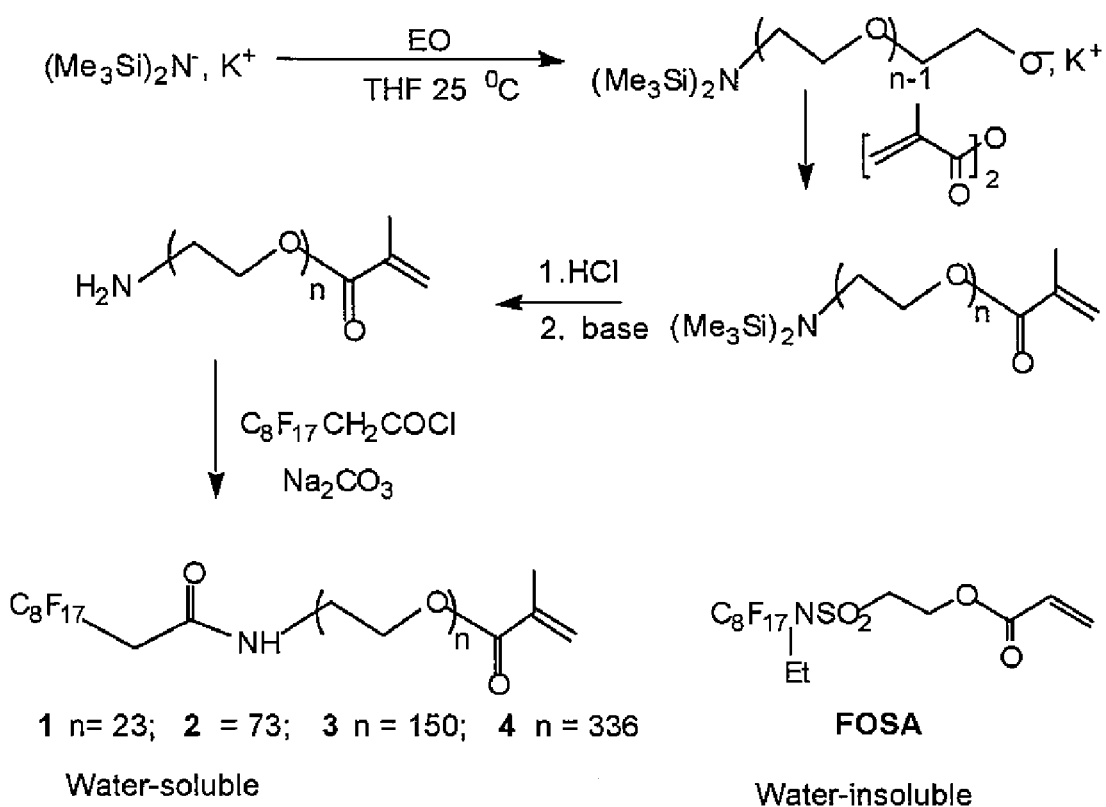
FIG. 10 shows a schematic representation for the synthesis of exemplary fluorocarbon macromonomer.

FIG. 10 shows an exemplary synthesis mechanism for attaching a fluorocarbon to an end of a polymer.

In some embodiments, a spacer (S) may also be inserted between the $R_F$ group and the polymer. Suitable spacers may include small groups containing one or more methylenes and may containing one or more oxygen or other heteroatoms.

In still some embodiments, the $R_F$ group may further include a small molecular moiety, for example, a chromophore, or a functional group such as a sugar suitable for molecular recognition.

The $R_F$ functionalized constituent polymers can be blended together by any blending means commonly known in the art. The proportion of each constituent polymer forming the blend will depend on application and desired properties. Preferably, blending involves physical blending in the solution state. In some embodiments, blending may also be achieved in solid state. In one exemplary embodiment, blending may be carried out in ordinary laboratory glassware equipped for heating stirring or in simple pilot or plant reactors similarly equipped. The blends are preferably uniform and stay uniform with no phase separation upon cooling and reheating. In still some embodiments, blending may follow a self-organization process and do not require much assistance in the way of physical stirring.

For the purpose of the present invention, polymer blends obtained from methods of the present invention will be generally referred to as "fluorocarbon mediated polymer blends,"

or FMB for short. Such blends may have superior characteristics including, for example, improved toughness, strength, transparency, conductivity, lubricity, or any other desired characteristics. Thus, they may naturally lend themselves to a wide range of applications.

To further illustrate the advantages and potential applications of the present invention, the following specific examples are provided.

EXAMPLES

Example 1

As an example of the present invention, perfluorocarbon terminated polystyrene ($R_F$-PS) and poly n-butyl methacrylate ($R_F$-PBMA) were synthesized by atom transfer radical polymerization (ATRP), using a partially fluorinated initiator (2-Bromo-2-methyl-propionic acid 2,2,3,3,4,4,5,5,6,6,7,7,8,8,8-pentadecafluorooctyl ester) (Perrier, S.; Jackson S. G.; Haddleton, D. M. et al. *Tetrahedron*, 2002, 58, 4053, the entire content of which is incorporated herein by reference), and characterized by size exclusion chromatography (SEC) and $^1$H and $^{19}$F NMR, as shown in Table 1. Thin (~0.1-10μ) films of the polymer blend were prepared by spin coating a 2 wt % toluene solution of blends with different ratios of two $R_F$ end functionalized components onto silica wafers (0.5×0.5 in. square) or glass slides. All films were oven dried or annealed at 120° C. for 24 h. Blends of the corresponding homopolymers lacking the $R_F$ end groups were also prepared and studied.

TABLE 1

Physical Properties of Polymer Blend Components

| polymer | Mn | PDI | surface tension (dyn/cm) | glass transition Tg (K) |
|---|---|---|---|---|
| $R_F$-PS | 20,506 | 1.40 | 40.7 | 373 |
| $R_F$-PBMA | 21,369 | 1.10 | 31.2 | 293 |

The optical transmittance of the films cast from toluene solution of PS/PBMA and $R_F$-PS/$R_F$-PBMA on cover pyrex glass was measured by UV/Vis spectrometry. As seen in FIG. 2, from 350-1000 nm the blend of the $R_F$ modified polymers had much greater transmittance than its conventional PS/PBMA blend that shows light scattering below 1000 nm. This dramatic difference suggests much smaller microdomains for the $R_F$ blend.

Figure 3:
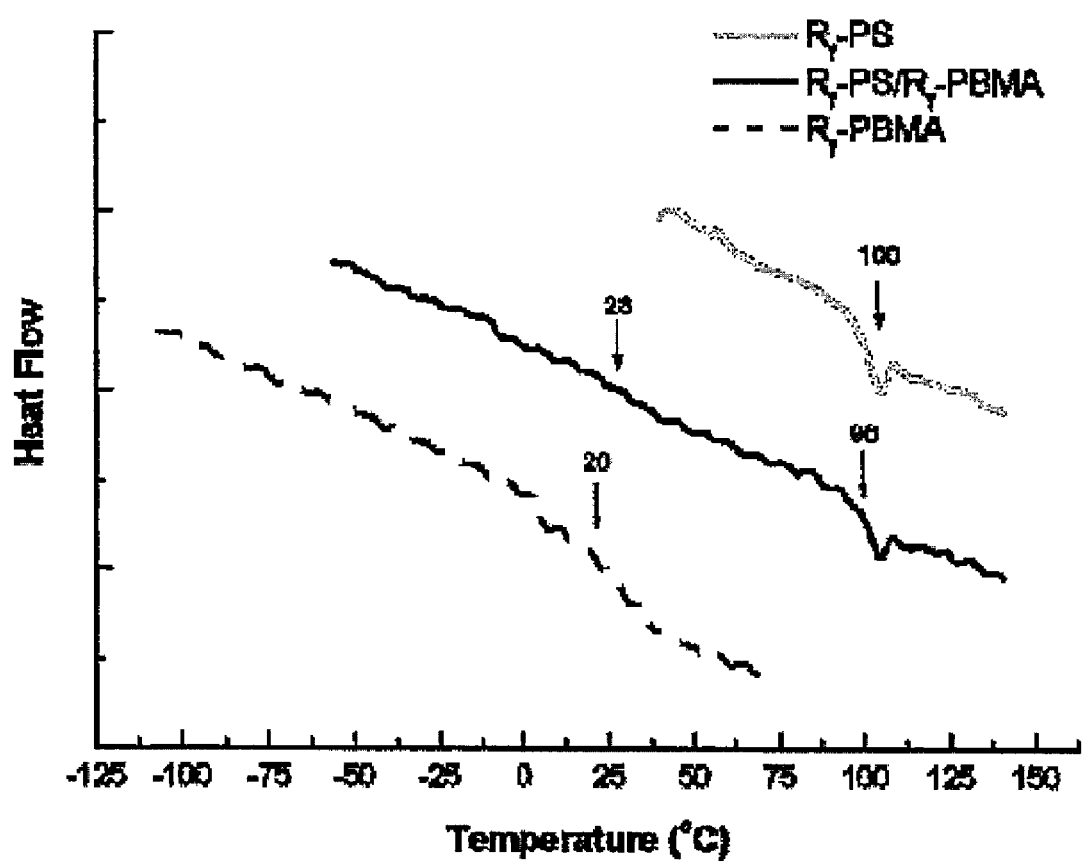
FIG. 3 DSC of $R_F$-PS/$R_F$-PBMA.

Differential scanning calorimetry (DSC) of a 1/1 blend $R_F$-PS/$R_F$-PBMA shown in FIG. 3 shows two Tgs corresponding to each of the two polymer components suggesting phase separation. The difference between the two Tgs was smaller than that for the homopolymers, showing improved miscibility.

Figure 4:
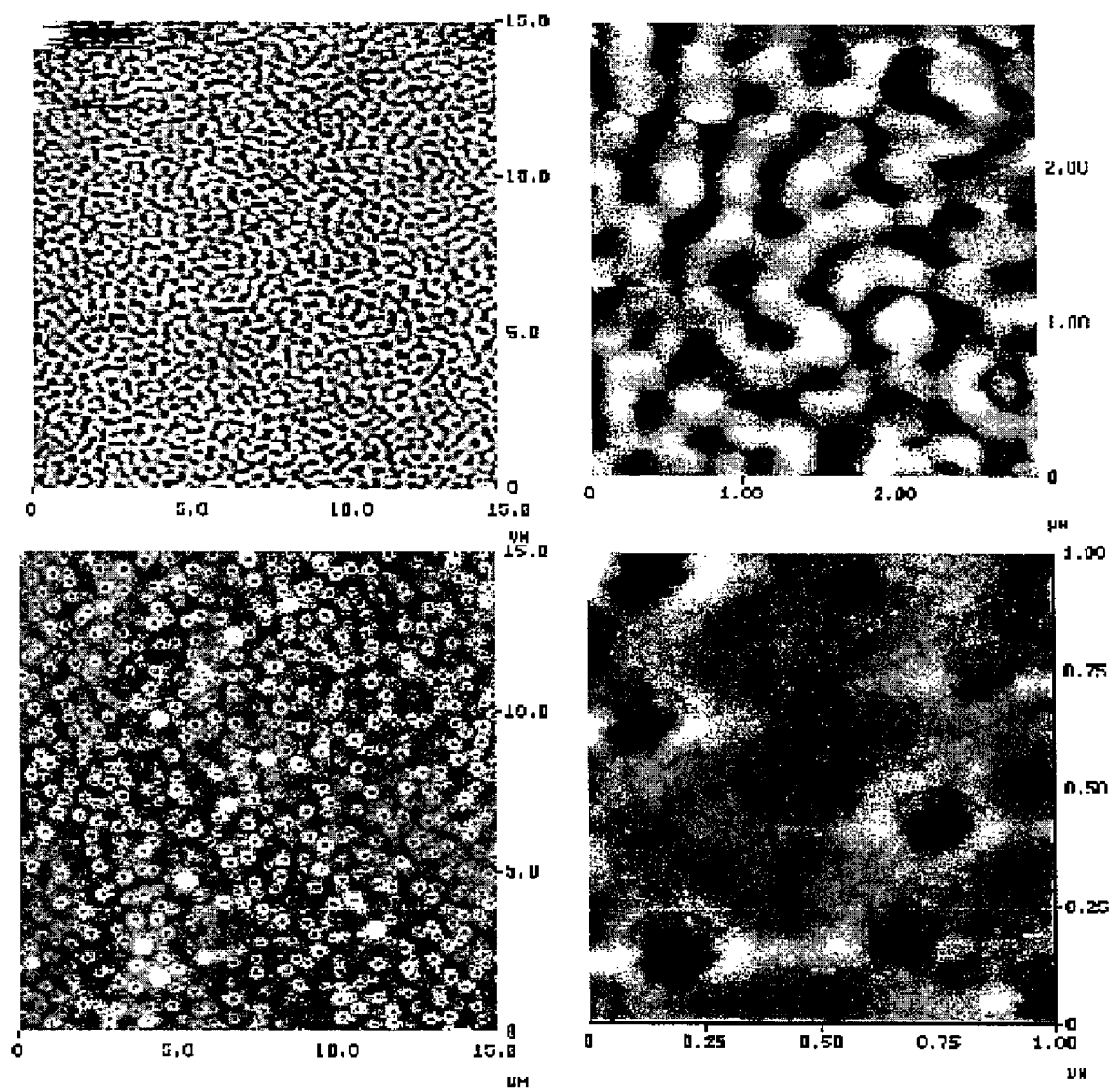
FIG. 4 AFM images of blends of PS/PBMA (upper) and of the corresponding $R_F$ modified blends.

Atomic force microscopy (AFM) of the surface topology of the 50/50 (wt/wt) conventional PS/PBMA blend (FIG. 4 a,b) shows a bicontinuous structure, with holes about 30 nm in depth and 250-1000 nm in size. AFM of the blend surface of $R_F$ modified polymers (c,d) is much smoother, with more evenly distributed domains of around 300 nm diameter having peculiar looking "craters" of about 20 nm in depth and about 100 nm in diameter. The elevated "crater" domains are believed to be due to the perfluorocarbon groups that are highly surface-active (L. H. Sperling, *Introduction To Physical Polymer Science*, John Wiley & Sons, New Jersey, 2006, 404, the relevant portions are incorporated herein by reference).

In addition to the above, other otherwise incompatible polymer pairs such as polystyrene-polymethylmethacrylate (PS-PMMA) and polystyrene-polybutadiene (PS-PBD) also show greatly improved compatibility profiles upon end-functionalization with similar perfluorocarbon groups. Although the perfluorocarbons are expensive, the fractions needed are very small, amounting to only a few percent. Furthermore, with higher molecular weights polymers the percentage should be even smaller. As demonstrated in this Example, methods in accordance with the present invention have great applicability for enhanced compatibilization of polymer blends.

The $R_F$ groups can be introduced in a chemically convenient way, either through the use of perfluorocarbon radical initiators or by using terminating agents, for instance, through anionic- or cationic living polymerizations. The application of these principles to other polymerizations such as metathesis, ROMP and other chain or step polymerizations will allow many polymer blends to be easily obtained and evaluated.

Fluorocarbon-mediated blends (FMBs) according to this embodiment of the present invention may have applications in refractive index-matching and/or refractive index fine-tuning. The mechanical properties of the $R_F$ blends are important in improving impact resistance and toughness.

Example 2

In the previous Example, we have described exemplary embodiments of the present invention which formed wholly or partially transparent blends of polymers A and B mediated by perfluorocarbon ($R_F$) polymer end groups. These end-functionalized polymers may be generated for both chain and step polymers as well as other polymer types commonly known in the art. For instance, films formed by the physical blending of $R_F$ end capped polystyrene ($R_F$-PS) and poly(n-butylmethacrylate) ($R_F$-PBMA) (1/1, w/w) having number average molecular weights of about 20,000 gives optically transparent blends. The corresponding blends not having $R_F$ end groups give only translucent blends. Light transmission, differential scanning calorimetry (DSC) and atomic force microscopy (AFM) of films of these blends indicate that the domain sizes of the individual polymer domains compared to the unmodified blends have decreased appreciably from microns to nanometers (<350 μm) (FIG. 1).

The corresponding polystyrene/polymethylmethacrylate (PS-$R_F$/$R_F$-PMMA) blends show similar properties. This phenomenon is driven by strong mutual ("fluorophilic") interactions between $R_F$ groups of the two polymers giving $R_F$ micelles. Such interactions occur in both aqueous and non aqueous solvents (e.g., dioxane and methanol) and in the solid state (see references 1-7, the relevant portions of these references are incorporated herein).

The extent and nature of micellization for $R_F$ functionalized polymers in solution or the solid state depends on a number of well documented factors that include:

1. $R_F$ length relative to polymer mass. Thus the degree of micellization may be adjusted by variation by both $R_F$-size or polymer mass.
2. Position of the $R_F$ group with respect to the rest of the molecule. For instance, we have unexpectedly discovered that $R_F$ end groups associate more effectively than pendent groups. [5-7] However the fraction of pendent $R_F$ groups may be varied more conveniently by copolymerization with $R_F$ vinyl monomers at nearly constant polymer mass. [1-4] Furthermore "spacer" groups (FIG. 5) between the $R_F$ group and the polymer backbone will strongly promote the formation of $R_F$ micelles by reducing polymer-polymer excluded volume effects. [2,5-7]

Figure 5:
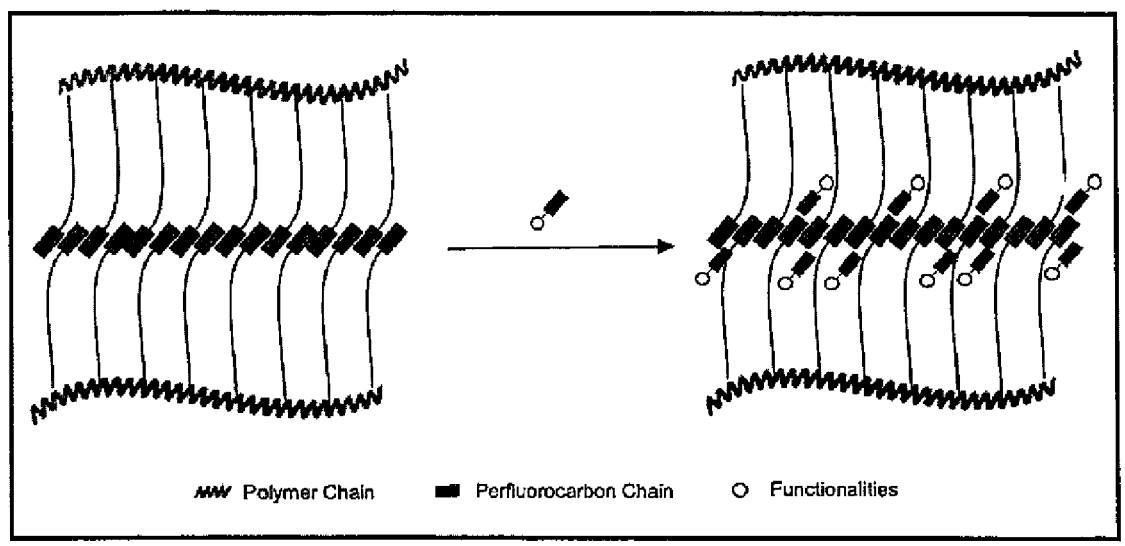
FIG. 5 Mixed micellization of different perfluorocarbon functionalized A/B vinyl polymers (lower wavy line/upper wavy line) having perfluorocarbon pendent $R_F$ groups (center rectangles) and $R_F$-containing small molecules bearing functionalities (circles).

Polymer $R_F$ micelles are capable of interacting with $R_F$ surfactants to give mixed micelles the formation of which is driven by the same fluorophilic interactions. The same principle also applies to small molecules with $R_F$ groups bearing additional functionalities (i.e. chromophores, catalysts, etc.) to give mixed micelles in solution or in the solid state (FIG. 5). Thus, as shown by fluorescence and UV/Vis. absorption measurements, fluorophilic interactions of $R_F$ chromophores give rise to effective adsorption of $R_F$ pyrene derivatives on surfaces of partially fluorinated polymer films has been demonstrated [8,9].

The exemplary embodiments disclosed in this Example generally involve the role of the $R_F$ functionalized molecules located in the $R_F$ micellar domains at the polymer-A-$R_F$/$R_F$-polymer-B (i.e. PS-$R_F$/$R_F$-PBMA) (FIG. 5). Regardless of the precise shape of these micelles, the functionalized molecules must be in close proximity to both polymer domains.

This spatial control of functionalized molecules relative to the polymer A/B interface is of conceptual interest and has ramifications in several areas including organic light emitting diodes (OLED's) and/or light harvesting, chromatography and catalysis.

EXEMPLARY EMBODIMENT 1

Chromatography Application

Thermal, optical, and atomic force microscopy (AFM) measurements have shown that polystyrene (PS) and polybutylmethacrylate (PBMA) endowed with $C_7F_{15}$ (or other perfluorocarbon groups) at the chain end (PS-$R_F$/PBMA-$R_F$) give much better blends (see above). This is due to the formation of perfluorocarbon micelles that reduce the sizes of the PS and PBMA domains through fluorophilic interactions and render such polymer domains smaller and far more regular i.e. spherical (FIG. 3). [1,2]

Figure 6:
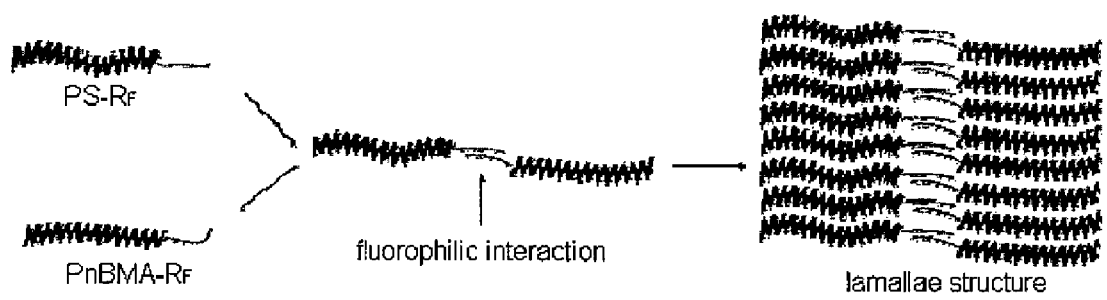
FIG. 6 Formation of perfluorocarbon micelles from blends of $R_F$ end-functionalized PS and PBMA polymers.

AFM and other studies of PS-$R_F$/$R_F$-PBMA films indicate that the perfluorocarbon micelles should be located at the PS/PBMA interfaces (FIGS. 5 and 6) and should also be present at the surface of these polymer blend films as the perfluorocarbon domains are highly surface active. As indicated above, the surface of these blends is dominated by "craters" demonstrated to correlate with the presence of $R_F$ micells/domains present at the surface (FIG. 3). It is envisioned that this will be useful in column chromatography carried out on organic fluorine compounds (OFC's), for instance, pharmaceuticals containing fluorine, $CF_3$ (or other $R_F$ groups). Using small particles (silica, glass, etc.) coated with thin layers of $R_F$ containing polymers or polymer blends, the presence of the $R_F$ domains at the surface should physically bind the fluorine atoms or fluorocarbon groups of the OFC's and this has been shown to occur [1,1]. The functionalities such as H bond donors (OH or COOH) or -acceptors ($NH_2$, $NR_2$) present on the polymer or polymer blends interacting with functional groups of the OFC's, for instance, through hydrogen bonding and/or other physicochemical interactions. It is further envisioned that the presence of these additional chemical functionalities on the A and/or B polymers may be easily introduced through vinyl copolymerization and will further enhance chromatographic separations.

Figure 8:
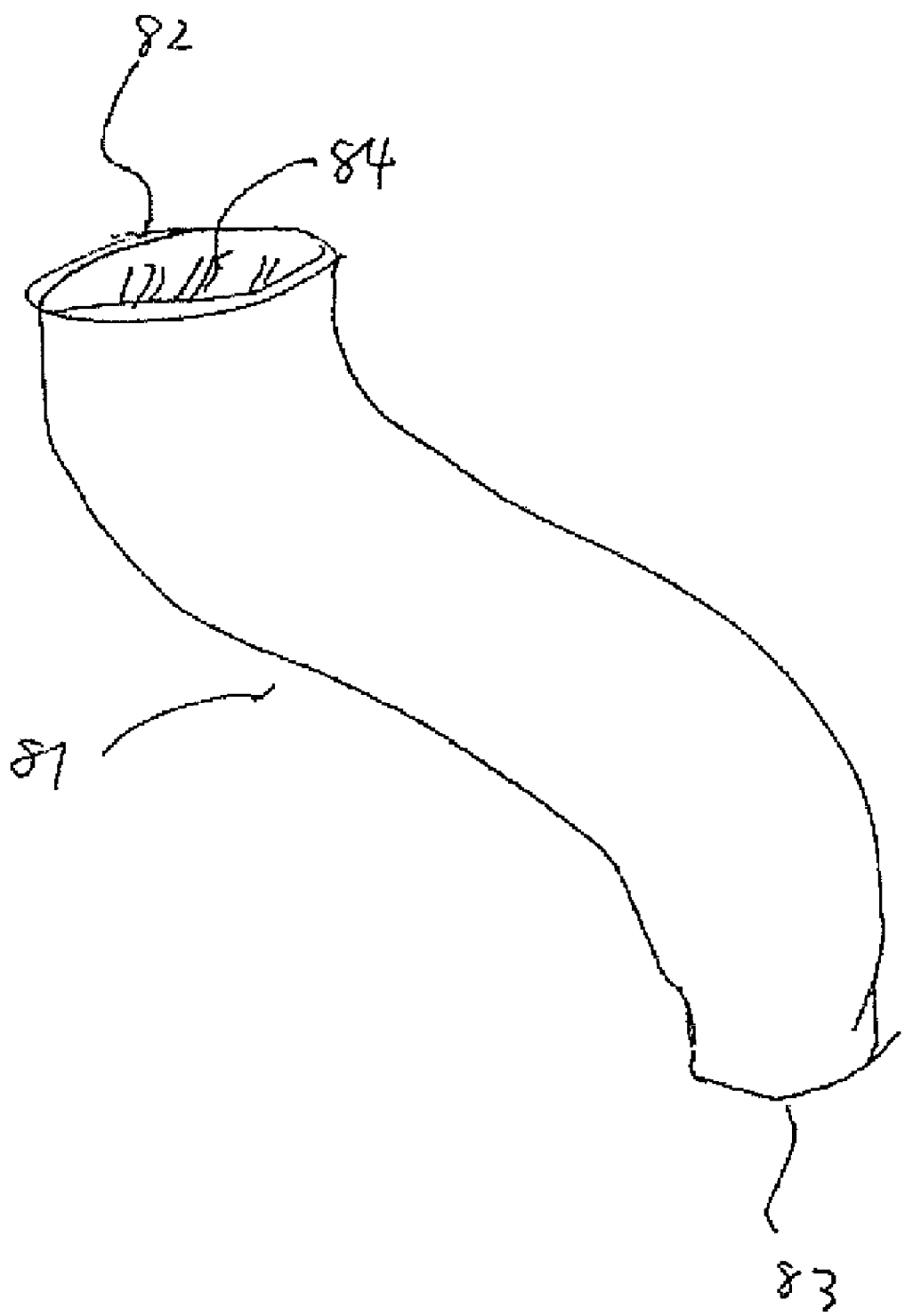
FIG. 8 shows an exemplary chromatographic column in accordance with the embodiments of the present invention.
Figure 9:
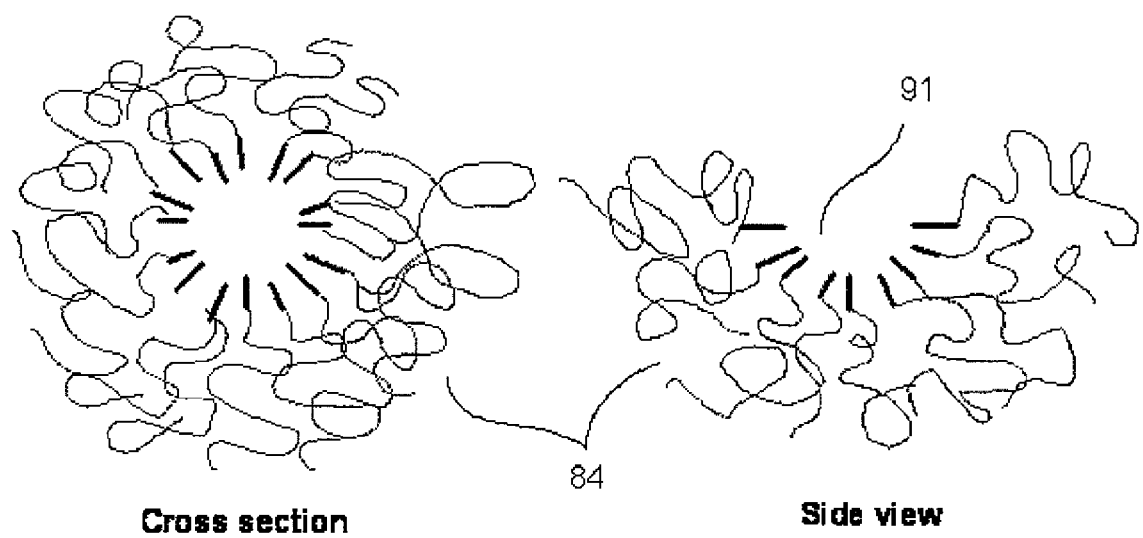
FIG. 9 shows a detailed view of a crater formed at the interface of fluorocarbon mediated polymer blend in accordance with embodiments of the present invention.

FIG. 8 shows an exemplary chromatographic column in accordance with the present invention. A chromatographic column of the present invention generally includes a hollow tubular body 81 having a first end 82 and a second end 83. A fluorocarbon mediated polymer blend of the present invention 84 is disposed inside the hollow body. FIG. 9 shows a detailed view of the fluorocarbon mediated polymer blend 84 which has craters 91 at an interface between two or more interacting $R_F$ functionalities. These interacting $R_F$ functionalities are exposed through the crater and are available to interact with an analyte solution.

EXEMPLARY EMBODIMENT 2

Light Harvesting/OLED Applications

Figure 7:
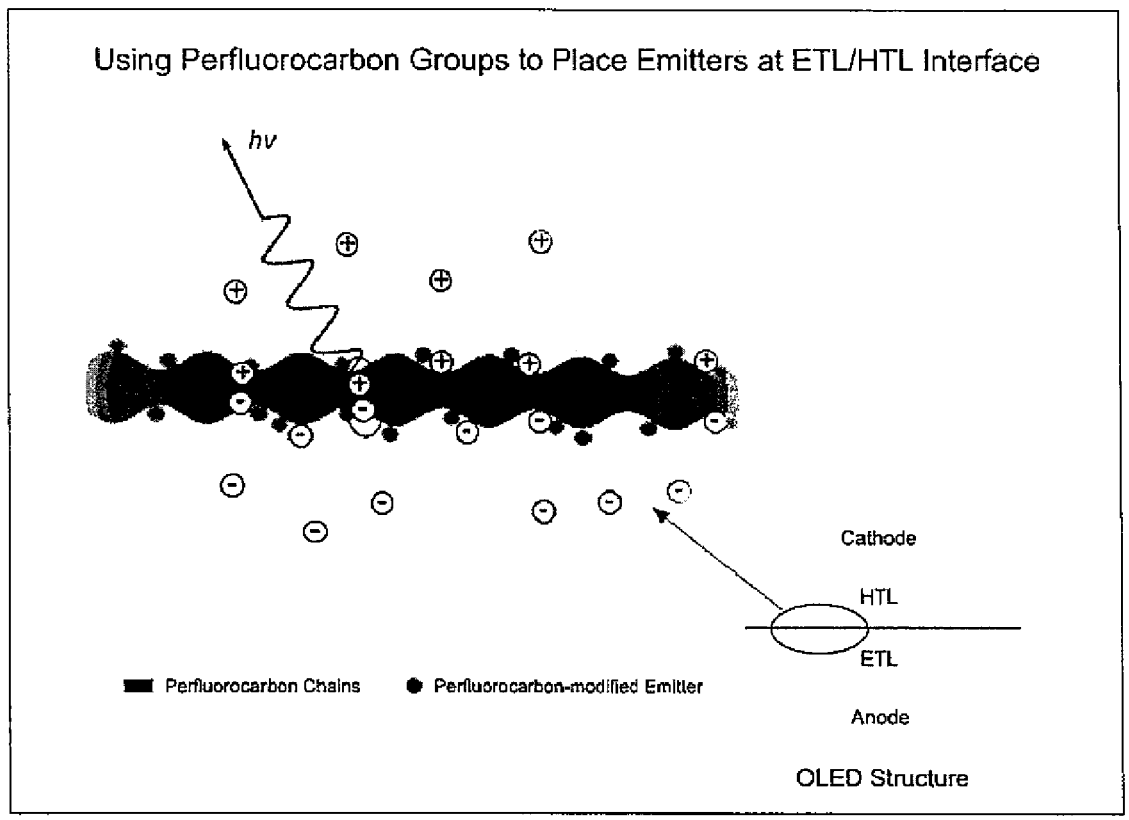
FIG. 7 OLED's and/or light harvesting self assemblies involving $R_F$ chromophores.

It is envisioned that the presence of $R_F$-functionalized chromophores in an A/B polymer interface will be applicable to organic light emitting diodes (OLED's) and/or light harvesting applications. As shown schematically in FIG. 7, the $R_F$ lamellae present at the interface of the hole-(A) and electron conducting (B) polymers contain the $R_F$ functionalized chromophores. In the absence of the $R_F$ interface the chromophores would be distributed more or less randomly over both polymer domains or selectively depending on the chromophore solubilities in the A and B domains. In case that the presence of the $R_F$ chromophore in one of the two domains, say B, is preferred this can be addressed, for instance, by inclusion of a fraction of pendent $R_F$ groups in the B polymer.

EXEMPLARY EMBODIMENT 3

Catalysis Enhancing Applications

Catalysts increase the rate of a given reaction by lowering the activation energy barrier between the reactants and the products. In molecular terms, one way to accomplish this is to increase the probability of the reactants meeting each other, preferably in the orientation conducive to reaction. In this regard, it is envisioned that FMBs of the present invention may be applied to catalysis. For example, physical binding of two different $R_F$ compounds (C and D) with X and Y reactive groups respectively to the surface of particles coated with thin films of Polymer-A-$R_F$/$R_F$-polymer-B may act as a site for catalysis. The $R_F$ surfaces to which both compounds C and B should bind should lead to enhanced reaction rates. We have shown binding of $C_7F_{15}$-functionalized pyrenes to the surface of PS-$R_F$/$R_F$-PBMA films. [9]

Additional chemical functionalities, Z, (proton donors, -acceptors, hydrocarbons etc.) may be incorporated through vinyl copolymerization (or chemical conversion) into A and/or B polymers. These help in binding (i.e. hydrophobic or H bonding) one of the desired reagents, C, which lacks the $R_F$ group, to the surface of the film where the X group of C would react with the Y group of the $R_F$ compound (D).

More interestingly additional chemical functionalities Z (bases, acids, hydrocarbons) may be covalently bonded to A and/or B polymers (one of which preferably will populate the polymer surface) that bind (i.e hydrophobic interactions) one of the desired compounds, C, which lacks the $R_F$ group, to the surface of the film where it would react with the Y group of $R_F$ compound (D).

EXEMPLARY EMBODIMENT 4

Chemical/Biochemical Sensor Applications

In this embodiment, it is envision that FMB of the present invention may be utilized for detection of analytes such as biological compounds containing $R_F$ (e.g. $CF_3$ and others) functionalized chromophores. When such an analyte is bound to the surface of a film or beads comprising $R_F$ groups through fluorophilic interactions and in the presence of a strongly bound (covalent or fluorophilic) chromophore susceptible to fluorescent resonance energy transfer (FRET) between the analyte chromophore and the FMB-bound chromophore, the presence of the analyte may be detected.

Although the present invention has been described in terms of specific exemplary embodiments and examples, it will be appreciated that the embodiments disclosed herein are for illustrative purposes only and various modifications and alterations might be made by those skilled in the art without departing from the spirit and scope of the invention as set forth in the following claims.

REFERENCES 1. (a) Zhang, Y-X. Da, A-H Butler G. B.; Hogen-Esch, T. E. "A Fluorocarbon-Containing Hydrophobically Associating Polymer". *J. Polym. Sci.*, Polym. Lett., 28, 213 (1990). (b) Zhang, Y-X. Da, A-H. Hogen-Esch T. E. Butler, G. B. "A Fluoride-Containing Hydrophobically Associating Polymer. I. Synthesis and Solution Properties of Copolymers of Acrylamide and Fluorine-Containing Acrylates or Methacrylates". *J. Polym. Sci., Chem. Ed.*, 30, 1383 (1992).
2. Hwang, F. S.; Hogen-Esch, T. E. "Effects of Water-Soluble Spacers on the Hydrophobic Association of Fluorocarbon-Modified Polyacrylamides". *Macromolecules* 1995, 28, 3328.
3. Seery, T. A. P.; Yassini, M.; Hogen-Esch T. E.; Amis, E. J. "Static and Dyanamic Light Scattering of Solutions of Hydrophobically Associating Fluorocarbon-Containing Polymers." *Macromolecules*, 25, 4784 (1992).
4. Xie, X.; Hogen-Esch, T. E. "Copolymers of N,N-Dimethylacrylamide and 2-(N-ethylperfluorooctane Sulfonamido) ethylacrylate (FOSA). Synthesis and Properties." *Macromolecules* 1996, 29, 1734.
5. Xie, D.; Tomczak, S.; Hogen-Esch T. E. "Synthesis and Hydrophobic Association of Poly(N,N-Dimethylacrylamide) (PDMA) End-Functionalized with Perfluorocarbon and Hydrocarbon Groups". *J. Polym. Sci. Part A: Polymer Chemistry*, 2001, 39, 1403.
6. Da J.; Hogen-Esch T. E. "Poly(N,N-dimethylacrylamide) with Perfluorocarbon Pendent Groups Connected Through Polyethylene-glycol Tethers Give Physical Gels in Organic Solvents". *Macromolecules* 2003, 36, 9559-9563.
7. Da J.; Hogen-Esch T. E. "Synthesis and Association of Poly(N,N-dimethylacrylamide) Copolymers with Perfluorocarbon Pendent Groups Connected Through Polyethylene-glycol Tethers". *J. Pol. Sci. A.* (*Chem. Ed.*) 2004, 42, 360.
8. Shen, J-G; Hogen-Esch, T. E. Manuscript in preparation.
9. Shen, J-G; Hogen-Esch, T. E. Unpublished results.
10. Shen, J.; Borak, K.; Thompson, M. Hogen-Esch, T. E. In progress.
11. (a) O'Mahony, T. K. P.; Cox, A. P.; Roberts, D. J. "Gas Chromatographic Separation of Perfluorocarbons". Journal of Chromatography 1993, 637(1), 1-11; (b) Danielson, Neil D.; Beaver, Larry G.; Wangsa, Julie. "Fluoropolymers and Fluorocarbon Bonded Phases as Column Packings for Liquid". Journal of Chromatography 1991, 544(1-2), 187-99.
12. Perrier, S.; Jackson S. G.; Haddleton, D. M. et al. *Tetrahedron*, 2002, 58, 4053
13. L. H. Sperling, *Introduction To Physical Polymer Science*, John Wiley & Sons, New Jersey, 2006, 404

What is claimed is:

1. A fluorine containing polymer blend, comprising:
   at least two constituent polymers each functionalized with at least one $R_F$ functionality,
   wherein the $R_F$ functionality is selected from the group consisting of $-(CF_2)_nCF_2H$, $-CO(CF_2)_nCF_2H$, $-(CF_2)_nCF_3$, $-CO(CF_2)_nCF_3$, $-S(CF_2)_nCF_3$, $-S-CO(CF_2)_nCF_3$, $-S-(CF_2)_nCF_2H$ and $-S-CO(CF_2)_nCF_2H$, wherein $4 \leq n \leq 20$, and wherein a spacer group, S, comprises one or more methylenes,
   wherein at least one constituent polymer is incompatible with at least one other constituent polymer before being functionalized with $R_F$ and wherein the constituent polymers are held together in the polymer blend via fluorophilic interactions between the added $R_F$ functionalities.

2. The polymer blend of claim 1, wherein the $R_F$ functionality is pendent or end-capped onto the constituent polymers.

3. A fluorine containing polymer blend comprising:
   at least two constituent polymers each functionalized with at least one $R_F$ functionality,
   wherein the $R_F$ functionality is selected from the group consisting of $-(CF_2)_nCF_2H$, $-CO(CF_2)_nCF_2H$, $-(CF_2)_nCF_3$, $-CO(CF_2)_nCF_3$ and any combinations thereof, where n varies between 4 and 20,
   wherein at least one constituent polymer is incompatible with at least one other constituent polymer before being functionalized with $R_F$ and wherein the constituent polymers are held together in the polymer blend via fluorophilic interactions between the added $R_F$ functionalities.

4. The polymer blend of claim 1, wherein the functionalized constituent polymers are each selected from the group consisting of:
   A. Vinyl polymers;
   B. Polyethers, polyesters, polyamides, polyacetals, and polysiloxanes formed by anionic or cationic ring opening chain polymerization of cyclic ethers, lactones, lactams and N-carboxyanhydrides, cyclic acetals, and cyclic siloxanes, respectively, and copolymers incorporating two or more of the above cyclic monomers;
   C. Polymers or copolymers synthesized by step (co)polymerizations including polyesters, polyamides containing alkylidene groups in the main chain, nylon 6/6, nylon 6, nylon 6/10, nylon 12, nylon 11, nylon 12/12, polyamides and polyimides, wherein said polyamides and polymides contain 1,4-phenylene or 5- or 6-membered hetrocyclic aromatic groups in the main chain, wherein said groups are selected from the group consisting of imidazole, oxazole, pyrazole, tetrazole, triazole, thiophene, pyridine, and triazine, polyurethanes, polycarbonates, aromatic polyethers having one or two alkyl groups on the phenylene group or polysulfides, poly(p-xylylene), and polysiloxanes; and any combinations thereof.

5. The polymer blend of claim 4, wherein the vinyl polymers have a number average molecular weight of approximately 20,000.

6. The polymer blend of claim 3, wherein the $R_F$ functionality is pendent or end-capped onto the constituent polymers.

7. The polymer blend of claim 3, wherein the functionalized constituent polymers are each selected from the group consisting of:
   A. Vinyl polymers;
   B. Polyethers, polyesters, polyamides, polyacetals, and polysiloxanes formed by anionic or cationic ring opening chain polymerization of cyclic ethers, lactones, lactams and N-carboxyanhydrides, cyclic acetals, and cyclic siloxanes, respectively, and copolymers incorporating two or more of the above cyclic monomers;

C. Polymers or copolymers synthesized by step (co)polymerizations including polyesters, polyamides containing alkylidene groups in the main chain, nylon 6/6, nylon 6, nylon 6/10, nylon 12, nylon 11, nylon 12/12, polyamides and polyimides, wherein said polyamides and polymides contain 1,4-phenylene or 5- or 6-membered hetrocyclic aromatic groups in the main chain, wherein said groups are selected from the group consisting of imidazole, oxazole, pyrazole, tetrazole, triazole, thiophene, pyridine, and triazine, polyurethanes, polycarbonates, aromatic polyethers having one or two alkyl groups on the phenylene group or polysulfides, poly(p-xylylene), and polysiloxanes; and any combinations thereof.

8. The polymer blend of claim 7, wherein the vinyl polymers have a number average-molecular weight of approximately 20,000.

9. The fluorine containing polymer blend according to claim 1, wherein the spacer group further comprises oxygen.

* * * * *